US011886146B2

(12) United States Patent
Di Domenico et al.

(10) Patent No.: US 11,886,146 B2
(45) Date of Patent: Jan. 30, 2024

(54) HOROLOGICAL MOVEMENT COMPRISING AN ESCAPEMENT EQUIPPED WITH A MAGNETIC SYSTEM

(71) Applicant: The Swatch Group Research and Development Ltd, Marin (CH)

(72) Inventors: Gianni Di Domenico, Neuchâtel (CH); Dominique Lechot, Les Reussilles (CH); Marc Stranczl, Nyon (CH); Benoît Légeret, Ecublens (CH)

(73) Assignee: The Swatch Group Research and Development Ltd, Marin (CH)

( * ) Notice: Subject to any disclaimer, the term of this patent is extended or adjusted under 35 U.S.C. 154(b) by 440 days.

(21) Appl. No.: 17/175,166

(22) Filed: Feb. 12, 2021

(65) Prior Publication Data

US 2021/0294270 A1 Sep. 23, 2021

(30) Foreign Application Priority Data

Mar. 18, 2020 (EP) .................................... 20164021

(51) Int. Cl.
*G04B 17/06* (2006.01)
*G04B 17/32* (2006.01)
(Continued)

(52) U.S. Cl.
CPC ........... *G04B 17/063* (2013.01); *G04B 15/06* (2013.01); *G04B 15/08* (2013.01); *G04B 17/06* (2013.01);
(Continued)

(58) Field of Classification Search
CPC ...... G04B 17/063; G04B 17/32; G04B 17/06; G04B 17/26; G04B 15/06; G04B 15/08; G04C 5/005; G04C 5/00
See application file for complete search history.

(56) References Cited

U.S. PATENT DOCUMENTS 2,724,235 A * 11/1955 Bauerle .................. G04C 5/005 368/324
3,183,426 A * 5/1965 Haydon ................. G04C 5/005 74/504

(Continued)

FOREIGN PATENT DOCUMENTS

CH 711 609 A2 4/2017
CH 715 049 A2 12/2019

(Continued)

OTHER PUBLICATIONS

Combined Chinese Office Action and Search Report dated May 13, 2022 in Chinese Patent Application No. 202110305234.7 (with English translation and Translation of Category of Cited Documents), 10 pages.

(Continued)

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A horological movement includes an escapement with a magnetic system to generate magnetic force impulses, so as to sustain the oscillation of the mechanical resonator associated with the escapement. In order to make possible an effective self-starting of the assembly formed of the mechanical resonator and of the escapement during a winding of the barrel, after a stop of the horological movement due to the unwound barrel spring, the escape wheel includes teeth and the pallet assembly includes two mechanical pallet-stones arranged to receive, upon starting, at least one mechanical force impulse of the escape wheel via one of the teeth thereof, the mechanical force impulse generating a starting force torque on the pallet assembly that is transmitted to the balance of the mechanical resonator to begin an (Continued)

oscillation of the latter so that the assembly can operate normally after a starting phase.

9 Claims, 4 Drawing Sheets

(51) Int. Cl.

| | |
|---|---|
| ***G04C 5/00*** | (2006.01) |
| ***G04B 15/06*** | (2006.01) |
| ***G04B 17/26*** | (2006.01) |
| ***G04B 15/08*** | (2006.01) |

(52) U.S. Cl.

CPC ............. *G04B 17/26* (2013.01); *G04B 17/32* (2013.01); *G04C 5/005* (2013.01)

(56) References Cited

U.S. PATENT DOCUMENTS

| | | | | |
|---|---|---|---|---|
| 3,630,018 A * | 12/1971 | Nicholas ................ | G04C 5/005 74/1.5 |
| 3,673,792 A * | 7/1972 | Scholz ................... | G04B 15/08 74/1.5 |
| 10,095,187 B2 * | 10/2018 | Di Domenico ........ | G04C 3/047 |
| 2016/0266546 A1 * | 9/2016 | Di Domenico ........ | G04B 15/14 |
| 2017/0242403 A1 | 8/2017 | Di Domenico et al. | |
| 2018/0314208 A1 * | 11/2018 | Shibuya ................. | G04B 13/02 |
| 2020/0064777 A1 | 2/2020 | Heraud et al. | |

FOREIGN PATENT DOCUMENTS

| | | |
|---|---|---|
| CN | 105849652 A | 8/2016 |
| CN | 106909053 A | 6/2017 |
| EP | 3 208 667 A1 | 8/2017 |

OTHER PUBLICATIONS

European Search Report dated Nov. 2, 2020 in European Application 20164021.6 filed Mar. 18, 2020 (with English Translation of Categories of Cited Documents), 5 pages.

* cited by examiner

HOROLOGICAL MOVEMENT COMPRISING AN ESCAPEMENT EQUIPPED WITH A MAGNETIC SYSTEM

CROSS-REFERENCE TO RELATED APPLICATION

This application claims priority to European Patent Application No. 20164021.6 filed on Mar. 18, 2020, the entire disclosure of which is hereby incorporated herein by reference.

TECHNICAL FIELD

The invention relates to horological movements comprising an escapement equipped with a magnetic system. More particularly, the invention relates to a escapement equipped with a magnetic coupling system between an escape wheel and a pallet assembly separated from the mechanical resonator, said pallet assembly having an axis of rotation different from that of the mechanical resonator. As for a Swiss pallet assembly, the pallet assembly has a reciprocating movement that is synchronous with the periodic movement of the mechanical resonator, but different. By magnetic escapement, it is understood an escapement equipped with magnets partially arranged on the pallet assembly and partially on the escape wheel so as to generate a magnetic coupling between the pallet assembly and the escape wheel.

TECHNOLOGICAL BACKGROUND

Various horological movements with magnetic escapement have already been proposed in patent applications. Concerning magnetic escapements comprising a pallet assembly separated from the mechanical resonator, document EP 3 208 667 can be cited, which describes a magnetic escapement with a pallet assembly mechanically coupled to the mechanical resonator and magnetically to the escape wheel, said latter having two annular magnetic tracks formed by a flat and continuous magnetised structure, which defines magnetic potential energy ramps and magnetic barriers for at least one magnetic pallet-stone of the pallet assembly that is arranged to alternately follow sections of the two magnetic tracks, said magnetic pallet-stone being formed by a magnet.

Magnetic escapements often have a problem upon starting. When the barrel is unwound and the horological movement stops, the escape wheel ceases to be driven in rotation by the barrel and the oscillation of the mechanical resonator is then significantly dampened then the mechanical resonator stops in an angular position corresponding to the rest position thereof or close thereto. Indeed, the stop position of the mechanical resonator may vary, in a certain angular area, around the rest position thereof depending on the angular position of the escape wheel when stopped given the magnetic coupling of said latter with the pallet assembly. Said angular area is limited by the two stop positions of the pallet assembly against two pins for limiting the reciprocating movement thereof, because the pin of the mechanical resonator is located in the fork of the pallet assembly when said resonator is finally immobile.

Upon starting, when the escape wheel starts to rotate again and to exert a force torque that increases as the barrel is wound, it is highly likely, in view of the magnetic system provided in some magnetic escapements, in particular in those described in document EP 3 208 667, that the escapement is not self-starting. As the mechanical resonator does not yet oscillate, it cannot therefore carry out the function thereof of unlocking the pallet assembly in order to drive it in a reciprocating movement, so that the escapement is not able to provide sufficient energy to the mechanical resonator for a normal oscillation of said latter to be established. In addition, according to the magnetic system provided, it is possible that the pallet assembly and the escape wheel mutually lock by a magnetic repulsion force at certain angular positions of the escape wheel, due to the fact that the mechanical resonator does not oscillate or not yet normally. Thus, it is necessary to find a solution to ensure effective starting of an escapement equipped with a magnetic system during a winding of the barrel after the horological movement has been stopped.

SUMMARY OF THE INVENTION

Generally, the invention relates to a horological movement comprising a mechanical resonator and an associated escapement that comprises an escape wheel having a first axis of rotation and a pallet assembly separated from the mechanical resonator and having a second axis of rotation that is different from that of the mechanical resonator. The mechanical resonator is coupled to the pallet assembly in such a way that, when said mechanical resonator has an oscillation, the pallet assembly undergoes a reciprocating movement between two rest positions wherein it alternately remains during successive time intervals. The pallet assembly comprises at least one magnetic pallet-stone formed of a magnet and the escape wheel comprises a periodic magnetised structure that defines a plurality of magnetic potential energy ascending ramps for said magnetic pallet-stone, each of said magnetic potential energy ascending ramps being provided so that said magnetic pallet-stone can climb it when the pallet assembly is in a corresponding rest position from the two rest positions and when a force torque provided to the escape wheel is equal to a nominal force torque or in a range of values that is provided for a normal operation of the horological movement. Said magnetic pallet-stone and the periodic magnetised structure are arranged in such a way that the pallet assembly undergoes a magnetic force impulse in the direction of the reciprocating movement thereof, after said magnetic pallet-stone has climbed any one of said magnetic potential energy ascending ramps, when the pallet assembly tilts from one of the two rest positions having enabled said magnetic pallet-stone to climb said any one of the magnetic potential energy ascending ramps to the other rest position.

In order to overcome the above-mentioned drawbacks and ensure an effective and rapid self-starting of an escapement equipped with a magnetic system provided in order to provide magnetic force impulses to the mechanical resonator via the pallet assembly, the escape wheel comprises at least one first distant portion relatively to the first axis of rotation and the pallet assembly comprises at least one second distant portion relatively to the second axis of rotation. Subsequently, when the mechanical resonator is at rest, the pallet assembly has for any angular position A of the escape wheel when stopped an equilibrium angular position $\beta_{ER}$ (θ) that depends on said angular position θ. According to the invention, for any angular position θ of at least one range of angular positions of the escape wheel, the first and second distant portions are in contact with one another while the mechanical resonator is at rest and the pallet assembly is in the corresponding equilibrium angular position $\beta_{ER}$ (0), the first and second distant portions being arranged in such a way that the equilibrium angular position $\beta_{ER}$ (θ) of the pallet assembly is, on at least one portion of each range of angular positions from said at least one range of angular positions, a monotonic function of the angular position θ of the escape wheel that moves away from a median position of the pallet assembly with a variation of said angular position θ in the direction of rotation provided for the escape wheel, said median position defining a zero angular position for the pallet assembly at equal angular distance from the two rest positions thereof. In addition, a maximum absolute value $AM_E$ of the equilibrium angular position $\beta_{ER}$ (θ) of the pallet assembly on said at least one angular range is strictly less than an absolute angular value $\beta_{Max}$ of the two rest positions.

According to a first particular embodiment, each first distant portion from said at least one first distant portion has, in a polar coordinate system perpendicular to said first axis of rotation and centred thereon, a first surface inclined in such a way that each of said at least one second distant portion may slide on at least one portion of said first inclined surface while the escape wheel passes through a corresponding range of angular positions from said at least one range of angular positions and while the pallet assembly angularly follows a curve defined by the corresponding equilibrium angular positions $\beta_{ER}$ (θ).

According to a second particular embodiment, which may be combined with the first particular embodiment, each second distant portion from said at least one second distant portion has, in the aforementioned polar coordinate system, a second inclined surface when the pallet assembly is in any equilibrium angular position $\beta_{ER}$ (θ) corresponding to any one of the angular position of a range of angular positions, from said at least one range of angular positions, wherein said second distant portion is in contact with a first distant portion from said at least one first distant portion, the second inclined surface being configured in such a way that each first distant portion from said at least one first distant portion may slide on at least one portion of said second inclined surface while the escape wheel passes through a range of angular positions, from said at least one range of angular positions, which is relative to the first and second distant portions considered and while the pallet assembly angularly follows a curve defined by the corresponding equilibrium angular positions $\beta_{ER}$ (θ).

According to a general embodiment, said at least one second distant portion of the pallet assembly is formed by two mechanical pallet-stones and the escape wheel comprises a plurality of distant portions constituting said at least one first distant portion, said plurality of distant portions being associated respectively to said plurality of magnetic potential energy ascending ramps. Subsequently, the two mechanical pallet-stones are associated respectively with two magnetic pallet-stones formed by two magnets arranged so as to each be at least periodically coupled magnetically, in repulsion, with the periodic magnetised structure of the escape wheel. In a main variant, the plurality of distant portions is formed by a plurality of teeth and the two mechanical pallet-stones are configured so as to form, in normal operation of the mechanical movement, mechanical stops for said plurality of teeth, so as to improve the operation of the escapement or to enable a step-by-step rotation of the escape wheel that is synchronised on the reciprocating movement of the pallet assembly and therefore on the oscillation of the mechanical resonator.

In an improved variant of the general embodiment, the pallet assembly and the escape wheel are arranged in such a way that, when the pallet assembly has said reciprocating movement and the force torque provided to the escape wheel is equal to said nominal force torque or in at least one upper portion of said range of values provided in normal operation and after one of the two magnetic pallet-stones has climbed any one of said magnetic potential energy ascending ramps following a tilting of the pallet assembly in the corresponding rest position thereof, the tooth of the escape wheel associated with said any one of said magnetic potential energy ascending ramps undergoes at least one first shock on one of the two mechanical pallet-stones of the pallet assembly. Said first shock momentarily prevents the rotation of the escape wheel beyond an angular abutment position, defined by said first or second mechanical pallet-stone, before a next tilting of the pallet assembly and it occurs so as to dissipate at least partially a kinetic energy of the escape wheel acquired following said tilting. In a preferred variant, the escapement is arranged so that, following the first shock and before the next tilting of the pallet assembly, the escape wheel momentarily immobilises.

BRIEF DESCRIPTION OF THE FIGURES

The invention will be described hereafter in more detail using the appended drawings, given by way of non-limiting examples, wherein.

DETAILED DESCRIPTION OF THE INVENTION

Figure 1A:
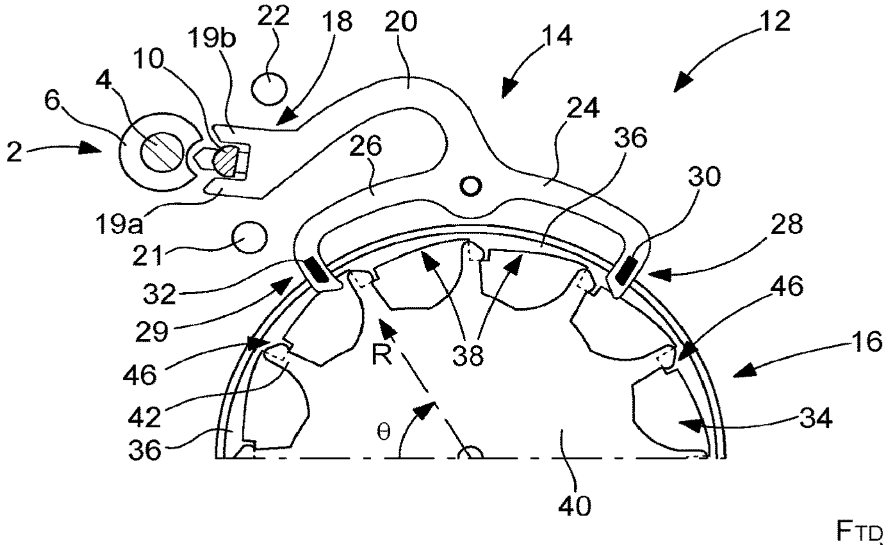
FIGS. 1A to 1I partially show a horological movement, according to one embodiment of the invention, with a hybrid escapement, configured to ensure a self-starting of the escapement, in successive positions.

Using the Figures, it will be described hereafter one embodiment of a horological movement according to the invention, which is of the mechanical type and comprises a mechanical resonator 2, whereof only the arbor 4, the safety roller 6 having a notch and the pin 10 have been shown. The horological movement comprises an escapement 12 that is associated with a mechanical resonator whereof the safety roller and the pin are elements forming said escapement. The escapement 12 further comprises an escape wheel 16 and a pallet assembly 14 that is a member separated from the mechanical resonator and whereof the axis of rotation is different from that of said mechanical resonator.

The pallet assembly 14 is formed, on the one hand, of a lever 20 terminated by a fork 18, comprising two horns 19*a* and 19*b*, and by a dart 8 and, on the other hand, of two arms 24 and 26 whereof the free ends form respectively two mechanical pallet-stones 28 and 29. The two mechanical pallet-stones support respectively two magnets 30 and 32 that form two magnetic pallet-stones of the pallet assembly 14. The mechanical resonator 2 is coupled to the pallet assembly in such a way that, when the mechanical resonator oscillates normally, said pallet assembly undergoes a reciprocating movement, synchronised on the oscillation of the mechanical resonator, between two rest positions, defined by two banking pins 21 and 22, wherein the pallet assembly remains alternately during successive time intervals.

The escape wheel 16 comprises a periodic magnetised structure 36 that is arranged on a disk 34 preferably made of non-magnetic material (not leading to magnetic fields). The structure 36 has globally circular magnetised portions 38 defining magnetic potential energy ascending ramps for the two magnetic pallet-stones 30, 32, which each have an axial magnetisation with a polarity opposite to that of the axial magnetisation of the periodic magnetised structure so as to generate the magnetic repulsion between the magnetic pallet-stones and the magnetised structure. Each magnetised portion 38 has an monotonically increasing width. Particularly, the width of the magnetised portions increases, over the entire useful length thereof, in a linear manner depending on the angle at the centre. According to an advantageous variant, the periodic magnetised structure 36 is arranged so that the outer periphery thereof is circular, the arc of circle portions 38 of said magnetised structure having the same configuration and being circularly arranged about the axis of rotation of the escape wheel.

Figure 2:
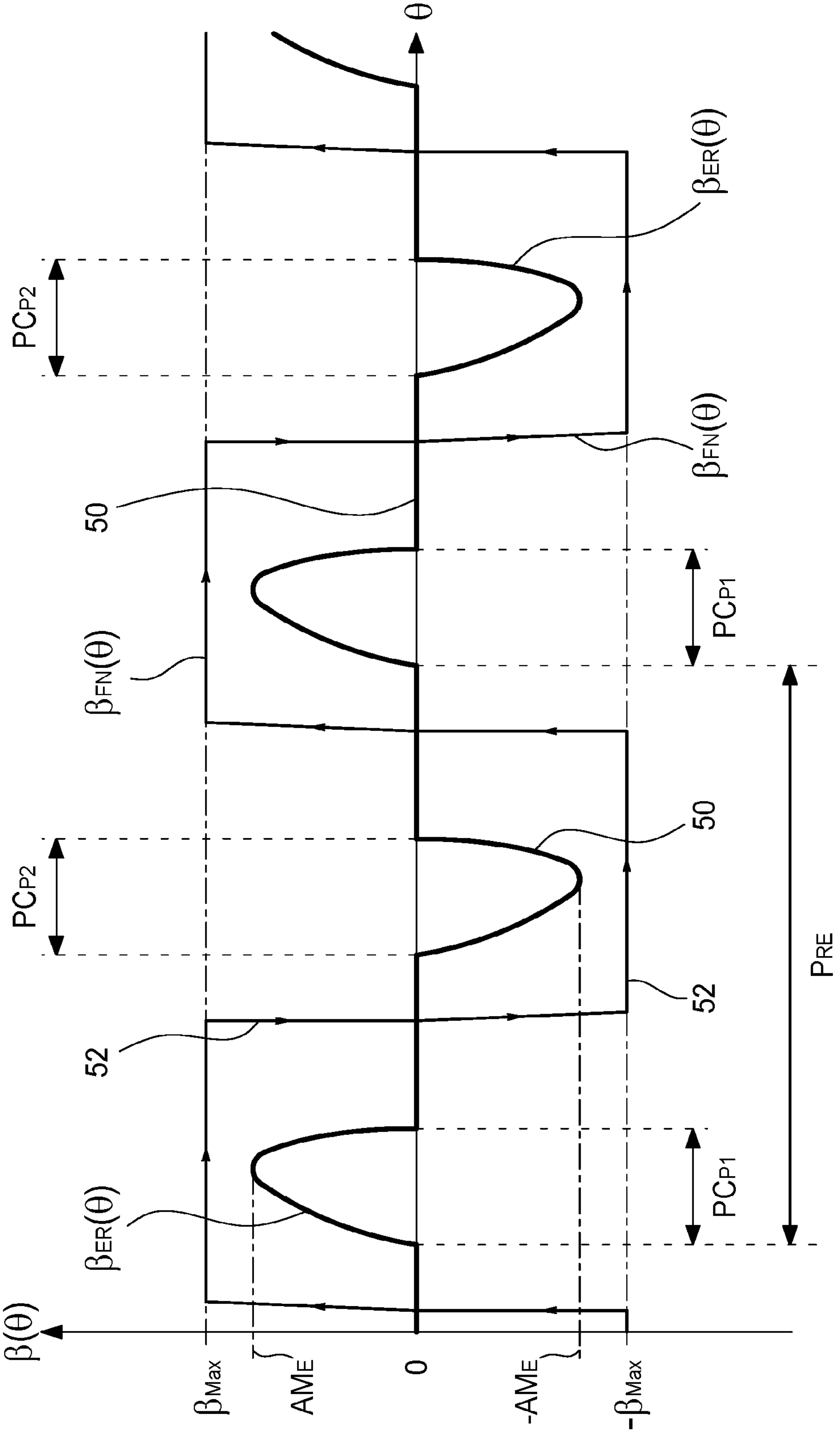
FIG. 2 schematically shows the periodic angular path β(θ) of the pallet assembly of the hybrid escapement of FIG. 1A depending on the angular position θ of the escape wheel when the horological movement is in normal operation and when the mechanical resonator is at rest and the escape wheel is stopped.

Generally, each magnetic potential energy ascending ramp is provided so that each of the two magnetic pallet-stones can climb it when the pallet assembly is in a given rest position, from the two rest positions thereof, and when a force torque provided at the escape wheel is substantially equal to a nominal force torque (case of a mechanical movement equipped with a constant force system for the driving of the escape wheel) or in a range of values provided to ensure the normal operation of the horological movement (case of a conventional mechanical movement having a variable force torque applied to the escape wheel depending on the winding level of the barrel or of the barrels if a plurality are provided in series). The magnetic potential energy ascending ramps are climbed, when the pallet assembly undergoes a reciprocating movement between the two rest positions thereof and when the force torque provided to the escape wheel is equal to said nominal force torque or in the range of values provided for said force torque in normal operation, successively by each of the first and second magnetic pallet-stones when the pallet assembly is respectively in the first and second rest positions thereof, and alternately by said first and second magnetic pallet-stones during the reciprocating movement of the pallet assembly. The two magnetic pallet-stones and the magnetic potential energy ascending ramps are arranged in such a way that the pallet assembly can undergo a magnetic force impulse in the direction of the movement thereof, after any one of the two magnetic pallet-stones has climbed any one of said magnetic potential energy ascending ramps, when the pallet assembly tilts from the rest position corresponding to said any one of the magnetic potential energy ramps to the other rest position thereof. The curve 52 shown in FIG. 2 gives the angular position $\beta_{FN}(\theta)$ of the pallet assembly, in normal operation of the horological movement, depending on the angular position $\theta$ of the escape wheel. The horizontal sections of the curve 52 correspond to the pallet assembly 14 in one or other of the two rest positions thereof (angular positions $+/-\beta_{Max}$) and the rising and falling flanks correspond to the alternate tilting of said pallet assembly, between the two rest positions thereof, during which the pallet assembly successively undergoes magnetic force impulses, which enables it to provide sustained impulses to the mechanical resonator via the fork 18.

The periodic magnetised structure 36 further defines for each of the two magnetic pallet-stones magnetic barriers 46 that are located respectively after the magnetic potential energy ascending ramps defined by the magnetised portions 38, said magnetic barriers in particular being formed by magnetised ranges 46 of the structure 36 whereof the radial dimension is substantially equal to or greater than the longitudinal dimension of each of the two magnets 30 and 32 forming the magnetic pallet-stones of the pallet assembly. Each magnetised range/magnetic barrier is arranged so as to exert a magnetic force torque on the escape wheel 16, having a direction opposite to that of said force torque provided to said escape wheel, when said escape wheel is in an equilibrium angular position of the forces that are exerted thereon while one or the other of the two magnetic pallet-stones is located at the top of the magnetic potential energy ramp/at the widest end of the magnetised portion 38 that precedes the magnetic barrier/the magnetised range 46 considered. The arrangement of the magnetic barriers is provided so that the magnetic force torque that is exerted on the escape wheel in each equilibrium angular position of the forces is greater than a maximum magnetic force torque generated by the magnetic potential energy ramp/the magnetised portion 38 preceding the magnetic barrier considered before the escape wheel reaches the equilibrium angular position of the forces.

The escape wheel further comprises protruding portions that are associated respectively with the magnetic potential energy ascending ramps. Said protruding portions are formed by teeth 42 extending radially from a roller 40 that is integral with the escape wheel and located above the disk 34 supporting the magnetised structure 36. Said teeth are located respectively after the magnetised portions 38, on the side of the widest end thereof, and are partially superimposed on the corresponding magnetised ranges 46. The teeth 42 are arranged to cooperate upon starting with the mechanical pallet-stones 28 and 29, as will subsequently be disclosed in more detail. The teeth and the mechanical pallet-stones are formed by a non-magnetic material.

In the advantageous variant shown, the teeth extend in a general plane wherein also extend the two mechanical pallet-stones 28, 29 of the pallet assembly. The two magnets 30, 32 are supported respectively by the two mechanical pallet-stones and are also located in said general plane. The figures only show a lower magnetised structure, located below the general plane. However, in an advantageous variant, the escape wheel further comprises an upper magnetised structure, of the same configuration as the lower magnetised structure and supported by an upper disk preferably formed of a non-magnetised material. The upper and lower magnetised structures together form the periodic magnetised structure. They have the same magnetic polarity, opposite to that of the two magnets of the pallet assembly, and are arranged on either side of the geometric plane wherein are located said two magnets forming the two magnetic pallet-stones, preferably at the same distance.

Before describing the main aim of the present invention in more detail, particular features will be described of the escapement of the advantageous embodiment considered, which makes it possible to improve the normal operation thereof (that is to say a stable operation, occurring after a starting phase, with a force torque $M_{RE}$ substantially provided to the escape wheel that is equal to the nominal force torque or in the range of values provided to ensure the normal operation of the horological movement, in particular a correct step-by-step rotation of the escape wheel). The pallet assembly 14 and the escape wheel 16 are arranged in such a way that, in normal operation, one of the teeth 42 of the escape wheel undergoes at least one shock on one or the other of the two mechanical pallet-stones after the corresponding magnetic pallet-stone has climbed any one of the magnetic potential energy ascending ramps following a tilting of the pallet assembly. Said shock occurs so as to dissipate at least partially a kinetic energy of the escape wheel acquired following said tilting. The teeth of the escape wheel are provided to absorb the kinetic energy of said escape wheel, at each step of the escape wheel after an accumulation of magnetic potential energy in the escapement for a next sustained impulse of the mechanical resonator, and to thus limit a terminal oscillation during each step of the step-by-step rotation thereof.

In the case of a conventional mechanical horological movement, namely without a system for driving the escape wheel at constant force, it is provided that, for the entire range of values $PV_M$ of the force torque $M_{RE}$ provided to the escape wheel in normal operation, at least one first shock between any one of the teeth 42 of the escape wheel and any one of the mechanical pallet-stones of the pallet assembly occurs after the corresponding magnetic pallet-stone has climbed one of the magnetic potential energy ascending ramps associated with said corresponding magnetic pallet-stone and with the tooth having undergone said at least one first shock.

In a main variant, the escapement is arranged in such a way that, following said at least one first shock of any one of the two mechanical pallet-stones against any one of the teeth of the escape wheel, said first shock momentarily stopping the rotation of the escape wheel beyond an angular abutment position, and before a next tilting of the pallet assembly, the escape wheel immobilises in an angular stop position that corresponds by definition to an equilibrium position of the forces present.

In a preferred variant, in normal operation and once the escape wheel is momentarily stopped, a tooth 42 presses against a mechanical stop of the pallet assembly formed by one or the other of the two mechanical pallet-stones. The escapement is therefore a hybrid escapement, that is to say magnetic and mechanical. For a conventional movement, it is therefore provided, in normal operation and for the entire range of values $PV_M$ of the force torque $M_{RE}$, that the escape wheel momentarily immobilises, after at least one first shock of any one of the teeth thereof against any one of the two mechanical pallet-stones and before a following tilting of the pallet assembly, at an angular stop position wherein the any one of the teeth presses against the any one of the mechanical pallet-stones. Each angular stop position is thus defined by a tooth bearing against a mechanical pallet-stone.

In a general variant, for at least one upper portion of said range of values $PV_M$ of said force torque $M_{RE}$ provided to the escape wheel in normal operation, at least one first shock between any one of the teeth of the escape wheel and any one of the mechanical pallet-stones of the pallet assembly occurs after the corresponding magnetic pallet-stone has climbed one of the magnetic potential energy ascending ramps associated with said corresponding magnetic pallet-stone and with the tooth concerned. In a particular variant of the general variant, when the force torque $M_{RE}$ has a value in at least one upper area of said upper portion of the range of values $PV_M$, it is provided that the tooth having undergone said at least one first shock presses, once momentarily immobile in the corresponding angular stop position, against the mechanical pallet-stone whereon it has abutted.

Subsequently, the aim of the invention will be described more specifically. Generally, the escape wheel comprises at least one first distant portion relative to the axis of rotation thereof, and the pallet assembly comprises at least one second distant portion relative to the axis of rotation thereof. In the embodiment shown, the escape wheel comprises a plurality of first distant portions that are formed by the teeth 42, and the pallet assembly comprises two second distant portions formed respectively by the first and second mechanical pallet-stones 28, 29. When the horological movement is stopped as a result of the unwound barrel spring, the escape wheel 16 is also stopped and the mechanical resonator 2 is rapidly at rest (that is to say it is non-oscillating and does not have any kinetic energy). Subsequently, the pallet assembly 14 is for any angular position θ (angular stop position) of the escape wheel 16 in a corresponding equilibrium angular position $\beta_{ER}(\theta)$ that depends on said angular position. Generally, when the mechanical resonator is at rest, it is not necessarily located in the rest position thereof (minimum mechanical energy position with the balance-spring let down), because the pallet assembly may exert thereon a certain force, due to the magnetic system of the escapement and/or of the mechanical device that is provided within the scope of the invention, and move it in angular positions where the balance-spring of said mechanical resonator is then slightly tight and therefore exerts a small restoring force. In such a case, an equilibrium position is determined generally for the assembly consisting of the escapement and of the mechanical resonator for each angular position θ of the escape wheel, and an equilibrium angular position $\beta_{ER}(\theta)$ is determined for the pallet assembly. The curve 50 in FIG. 2, giving the equilibrium angular position $\beta_{ER}(\theta)$ of the pallet assembly 14 depending on the angular position θ of the escape wheel 16, has substantially horizontal sections at a median position, defining a zero angular position for the pallet assembly 14, at equal angular distance from the two rest positions of said pallet assembly that correspond to two extreme angular values $+/-\beta_{Max}$ for the reciprocating movement of the pallet assembly. When the pallet assembly 14 is in the median position '0', the mechanical resonator 2 is in the rest position thereof, so that the balance thereof is then not subjected to any restoring force by the balance-spring. Generally, in said latter case, it will be noted that there may be a certain uncertainty on the equilibrium angular position $\beta_{ER}(\theta)$ of the pallet assembly close to the median value or at said median value, but said uncertainty (or possible angular equilibrium area) is very small, in the order of the clearance of the pin 10 between the two horns 19*a* and 19*b* of the fork 18 of the pallet assembly. However, this is not the case in the embodiment shown, because the magnetic system of the escapement 12 holds the pallet assembly substantially in the angular position '0' in the absence of force exerted on the pallet assembly by the immobile mechanical resonator in the rest position thereof.

When the barrel of the horological movement is unwound (that is to say that the spring of said barrel is let down so that the force torque that it provides to the escape wheel no longer enables the driving thereof), the escape wheel stops in any one of the angular positions θ and, after a period of damping of the oscillation of the mechanical resonator 2, said latter is at rest and the pallet assembly is in the corresponding angular position $\beta_{ER}(\theta)$. In this situation, it is provided ranges of angular positions $PC_{P1}$ and $PC_{P2}$ of the escape wheel 16 wherein the first and second mechanical pallet-stones 28 and 29 are respectively in contact with a corresponding tooth from the plurality of teeth 42 of the escape wheel. Subsequently, the teeth 42 and the two mechanical pallet-stones 28, 29 are arranged in such a way that the equilibrium angular position $\beta_{ER}(\theta)$ of the pallet assembly 14 is, on at least one first portion of each of the ranges of angular positions $PC_{P1}$ and $PC_{P2}$, a monotonic function of the angular position θ of the escape wheel that moves away from the median position '0' of the pallet assembly with a variation of said angular position θ in the direction of rotation provided for the escape wheel, as shown in FIG. 2. In addition, it is provided a maximum absolute value $AM_E$ for the equilibrium angular position $\beta_{ER}(\theta)$ of the pallet assembly on the ranges of angular positions $PC_{P1}$ and $PC_{P2}$ that is strictly less than an absolute angular value $\beta_{Max}$ of the two rest positions of the pallet assembly, as also shown in FIG. 2.

Thanks to the aforementioned features, during a new winding of the barrel spring making it possible for the escape wheel 16 to resume rotating in the direction of rotation provided (clockwise in FIGS. 1A to 11), at least one of the two mechanical pallet-stones 28, 29 comes into contact with a tooth 42 of the escape wheel that may thus provide to the pallet assembly 14 a mechanical starting force torque and therefore a mechanical starting impulse. Thus, a rapid self-starting of the escapement 12 and therefore of the mechanical horological movement is made possible.

Particularly, the escape wheel 16 and the pallet assembly 14 are arranged in such a way that, when the escape wheel starts to rotate, in a starting phase, from any one of the angular positions by being subjected to a starting torque less than or equal to the force torque provided in normal operation, it does not encounter any abutment of magnetic or mechanical origin that is likely to stop it before said escape wheel reaches a next range of angular positions $PC_{P1}$ or $PC_{P2}$, particularly said at least one first portion of said next range of angular positions having said monotonic function. In addition, the teeth 42 and the mechanical pallet-stones 28, 29 are configured so that, in said next range of angular positions, the escape wheel 16 subjected to said starting torque is not stopped by the contact between the tooth and the mechanical pallet-stone concerned but that the tooth concerned may transmit at least mostly said starting torque to the pallet assembly. It will be noted that the variant shown is particular due to the particular magnetic system of the escapement. Indeed, in the absence of teeth 42, the equilibrium angular position of the pallet assembly would remain substantially at zero over a magnetic period PRE of the escape wheel, and therefore over a complete revolution of said escape wheel. Under these conditions, it is understood that no starting of the mechanical resonator and of the associated escapement would take place without specific means to this end being provided, in order to make it possible for the mechanical resonator to once again be activated and for the pallet assembly to have a resulting reciprocating movement.

In a first advantageous variant, shown in FIGS. 1A to 1C, 1E and 1G, each of the teeth 42 has, in a polar coordinate system R, θ(see FIGS. 1A to 11) perpendicular to the axis of rotation of the escape wheel 16 and centred thereon, a first inclined surface $SI_1$ that is inclined in such a way that each of the first and second mechanical pallet-stones 28, 29 may, in a starting phase, slide on said first inclined surface while the escape wheel passes through a corresponding range of angular positions θ, from the ranges of angular positions $PC_{P1}$ or $PC_{P2}$, and while the pallet assembly 14 follows at least partially a portion of the curve 50, which is defined by the equilibrium angular positions $\beta_{ER}$ (θ), corresponding to said range of angular positions. By 'inclined surface' in a polar coordinate system, it is understood a surface that is neither radial, nor tangential.

In a second advantageous variant, also shown in FIGS. 1A to 1C, 1E and 1G, each of the two mechanical pallet-stones of the pallet assembly has, in the polar coordinate system R, θ associated with the escape wheel, a second inclined surface $SI_2$ when the pallet assembly is in any one of the equilibrium angular positions $\beta_{ER}$ (θ) corresponding to any one of the angular positions θ of a range of angular positions, from the ranges of angular positions $PC_{P1}$ and $PC_{P2}$, wherein the mechanical pallet-stone considered is in contact with one of the teeth 42 of the escape wheel. The second inclined surface $SI_2$ is configured in such a way that each of the teeth 42 may, in a starting phase, slide on said second inclined surface while the escape wheel passes through a range of angular positions θ, from the ranges of angular positions $PC_{P1}$ and $PC_{P2}$, which is relative to the tooth and the mechanical pallet-stone considered, and while the pallet assembly 14 follows at least partially a portion of the curve 50, which is defined by the equilibrium angular positions $\beta_{ER}$ (θ), corresponding to said range of angular positions.

With reference to FIGS. 1A to 11, it will finally be described hereafter a starting sequence/starting phase of a hybrid escapement 12 according to the invention. These FIGS. 1A to 11 show a series of successive events occurring upon starting of the assembly formed of the mechanical resonator 2 and of the escapement 12 during a winding of the barrel of the horological movement incorporating said assembly, after a stop of the horological movement due to the unwound barrel spring thereof. In FIG. 1A, the horological movement is stopped, the mechanical resonator at rest and the pallet assembly in a corresponding equilibrium angular position, which is the median position of the pallet assembly that defines the zero angular position thereof. Said equilibrium angular position equal to '0' (FIG. 2), in the absence of contact with a tooth 42, results due to the fact that the magnetic pallet-stones 30, 32 are partially superimposed with the magnetised portions 38 of the periodic magnetised structure 36, each in a position corresponding to a radial magnetic force that is positive in the polar coordinate system associated with the escape wheel, which generates on the pallet assembly two opposite magnetic force torques that cancel out.

Figure 1B:
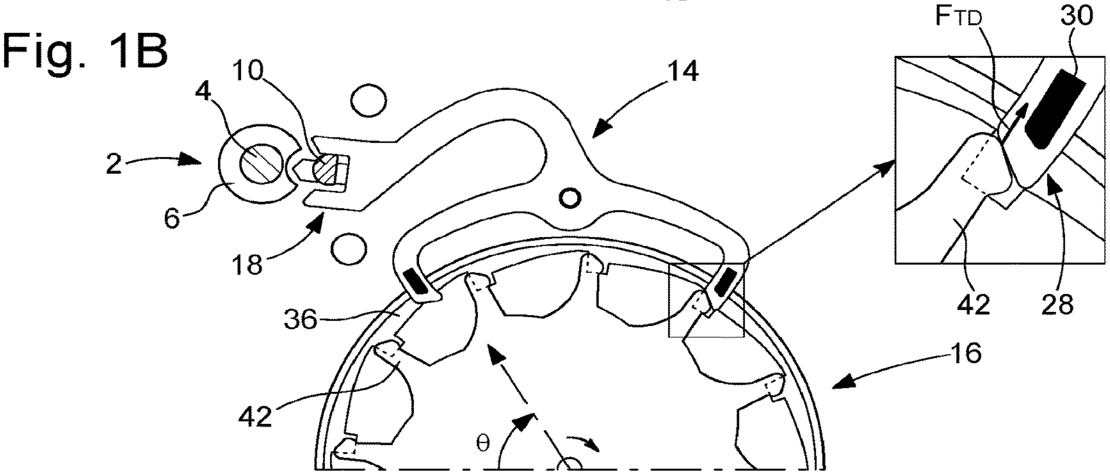
Figure 1C:
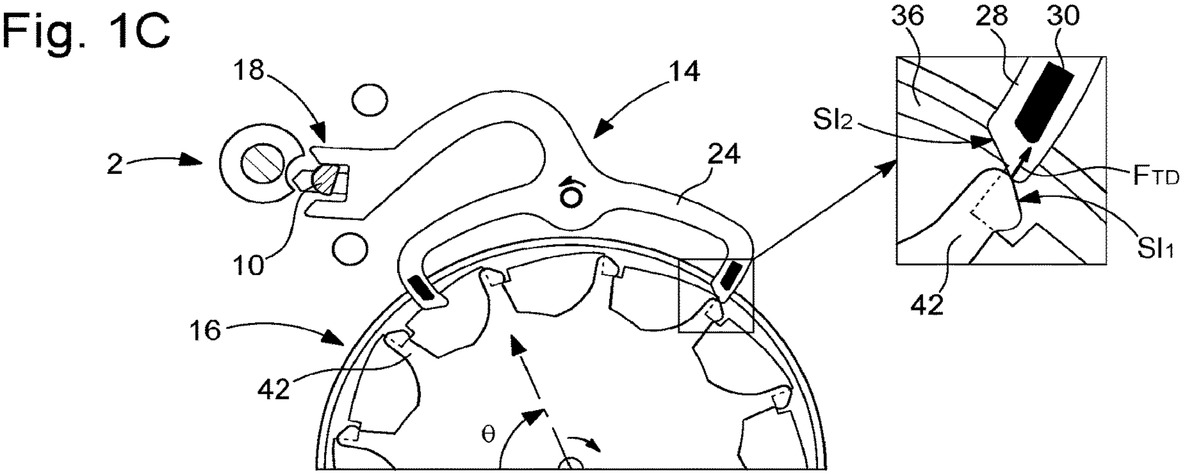

In FIG. 1B, upon starting, the mechanism for driving the escape wheel 16 applies a force torque to said escape wheel, making it possible for it to resume rotating clockwise provided for, and a tooth 42 then comes into contact with the mechanical pallet-stone 28 (event shown in FIG. 1B), so as to generate on said mechanical pallet-stone a tangential force $F_{TD}$ in a polar coordinate system r, β associated with the pallet assembly 14, that is to say perpendicular to the axis of rotation of said pallet assembly and centred thereon. Particularly, said tangential force $F_{TD}$ is obtained by the fact that the initial contact point between the tooth and the mechanical pallet-stone is located on at least one of the two inclined surfaces $SI_1$ and $SI_2$ (see FIG. 1C) that have respectively the tooth 42 and the mechanical pallet-stone 28 in the polar coordinate system that is associated with the escape wheel. The escape wheel continuing to rotate thanks to the starting torque that is applied thereto, the rounded end portion of the tooth then slides on the inclined surface $SI_2$ of the mechanical pallet-stone 28 (inclined in the polar coordinate system associated with the escape wheel) until the contact point is substantially located at the bottom of said inclined surface $SI_2$ (event shown in FIG. 1C), the tooth 42 exerting a tangential force $F_{TD}$ during the entire rotation of the escape wheel between FIG. 1B and FIG. 1C, and thus a starting torque on the pallet assembly 14, which transmits at least mostly the starting torque to the mechanical resonator 2 via a horn of the fork 18. The mechanical resonator thus receives a first mechanical starting impulse making it possible for it to be once again activated, by starting an oscillation. In a particular variant, the inclined surfaces $SI_1$ and $SI_2$ are inclined planes. It will be noted that, upon starting during the contact between a tooth and a mechanical pallet-stone, it is advantageous to have, as shown, a magnetic barrier 46 superimposed with the corresponding inclined surfaces $SI_1$ and $SI_2$ in order to be able to produce a certain magnetic repulsion force on the magnet associated with the mechanical pallet-stone in contact with the tooth. Said magnetic repulsion force reduces the contact force between the tooth and the mechanical pallet-stone and therefore the friction during the sliding of one on the other, which opposes the rotation of the escape wheel and therefore the starting. Said particular configuration facilitates the self-starting that may thus occur for a wider range of torque applied to the escape wheel.

In another variant, similar to the variant shown but with a pallet assembly having longer mechanical pallet-stones, during the starting phase, the inner corner of the mechanical pallet-stone 28, respectively the outer corner of the mechanical pallet-stone 29 starts by sliding, when the escape wheel rotates clockwise, on the inclined surface $SI_1$ of the tooth and subsequently only the rounded end portion of the tooth slides on the inclined surface $SI_2$ of the mechanical pallet-stone, as disclosed above. It is therefore understood, the benefit of having a configuration of the escapement with the two inclined surfaces $SI_1$ and $SI_2$, such as shown, where the inclined surface $SI_1$ has a slope slightly greater than that of the inclined surface $SI_2$ while a tooth and a mechanical pallet-stone are in contact during the starting phase of the assembly formed of the escapement and of the mechanical resonator. In the aforementioned advantageous variants, during the starting phase, it is provided that each angular contact area corresponds to contact points on one and/or the other of the two inclined planes $SI_1$ and $SI_2$. In a general variant, only the teeth or the two pallet-stones each have an inclined surface while respectively the two pallet-stones or the teeth each have a protruding portion configured so as to be able to slide upon starting along each of said inclined surfaces in the respective angular contact areas. For the pallet assembly, in the polar coordinate system that is associated therewith, the angular contact areas upon starting, namely the angular position areas $\beta(\theta)$ whereon there is contact upon starting, are given substantially by the curve 50 of the equilibrium angular positions $\beta_{ER}$ $(\theta)$, previously defined, on the respective angular contact areas for the escape wheel (FIG. 2).

Figure 1D:
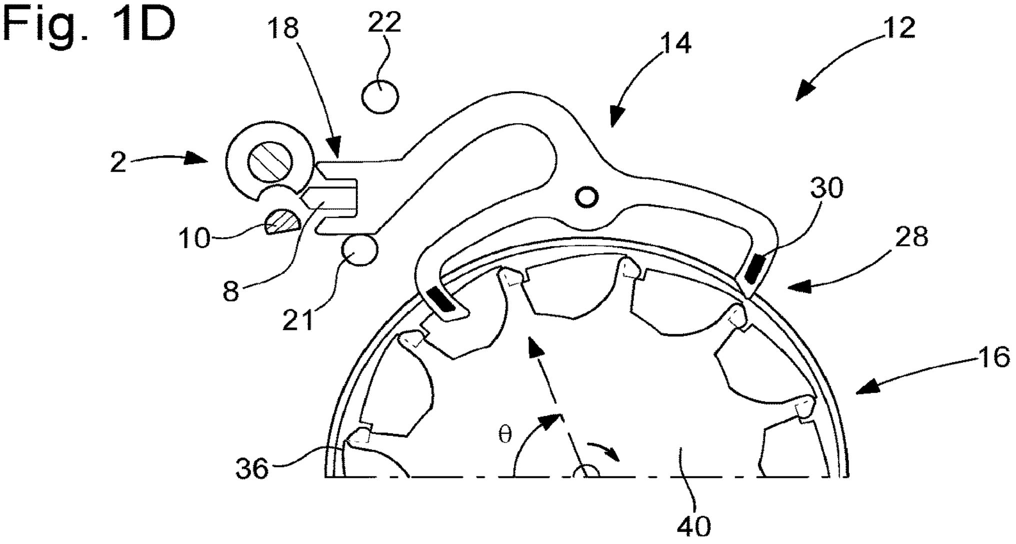
Figure 1E:
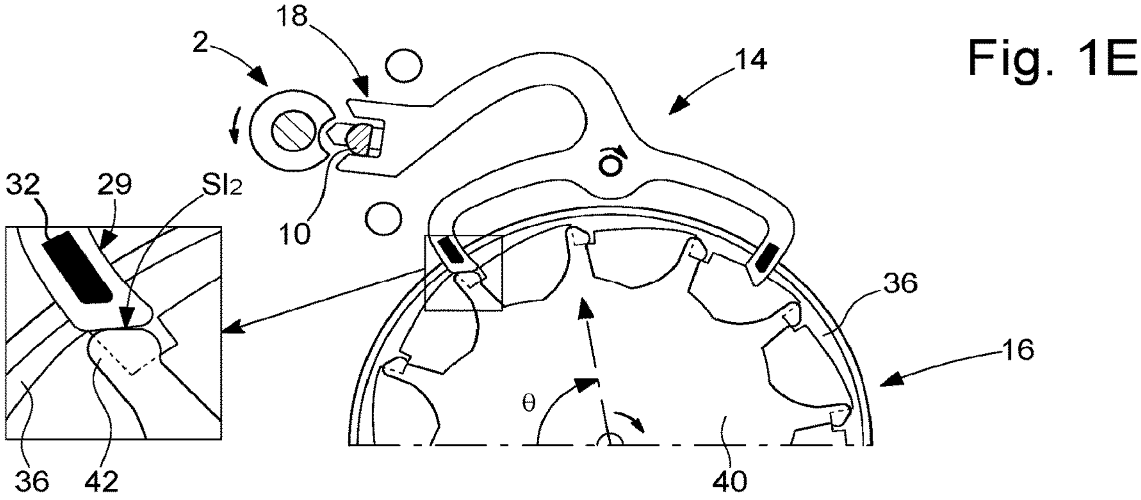
Figure 1F:
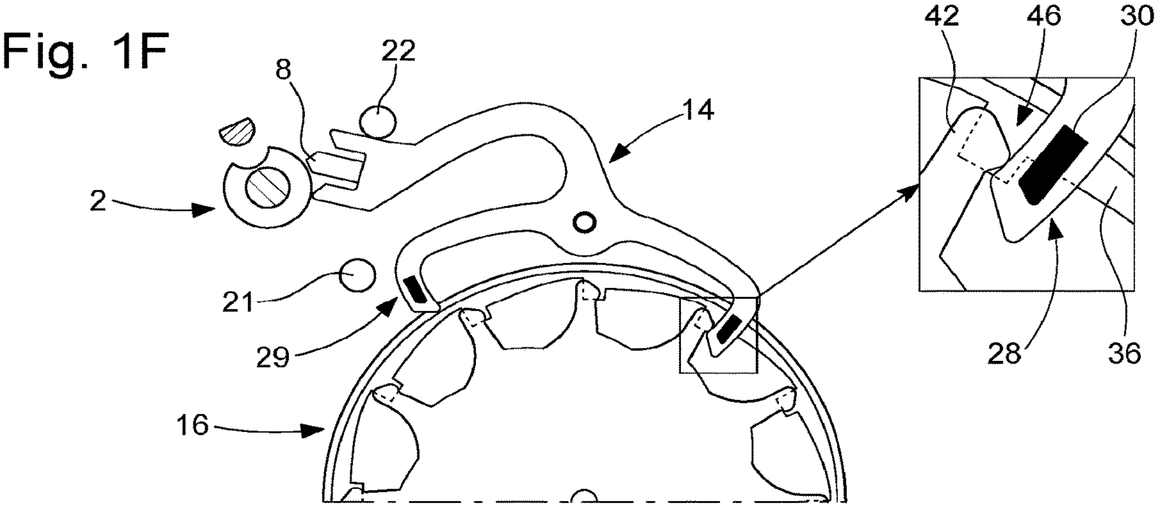

In FIG. 1D, it can be seen the low amplitude of a first vibration of the oscillation of the mechanical resonator 2 and the pallet assembly 14 in one of the two rest positions thereof. Subsequently, in FIG. 1E, while the pin 10 is once again in the fork 18 of the pallet assembly, a new mechanical impulse, applied to the pallet assembly and transmitted to the balance of the mechanical resonator via the fork 18 and the pin 10 integral with the balance, is generated by a contact between the mechanical pallet-stone 29 and a tooth 42. More specifically, the end of the tooth comes to abut against the inclined surface $SI_2$ of the mechanical pallet-stone 29 and optionally slides on a portion of said inclined surface, generating the mechanical impulse that comes in addition to a first magnetic starting impulse that is generated by the magnetic system of the escapement. A certain energy is thus transmitted once again to the mechanical resonator 2 whereof the oscillation increases in amplitude while the escape wheel rotates a little faster. As a result a tooth then comes to abut against an abutment surface of the mechanical pallet-stone 28 while the corresponding magnetic pallet-stone was able to climb entirely a magnetic potential energy ramp 38, as shown in FIG. 1F. From that moment on, the mechanical self-starting system may cease to be active and allow the magnetic system of the escapement coupled to the balance of the mechanical resonator to generate magnetic force impulses in order to sustain the oscillation of the mechanical resonator.

Figure 1G:
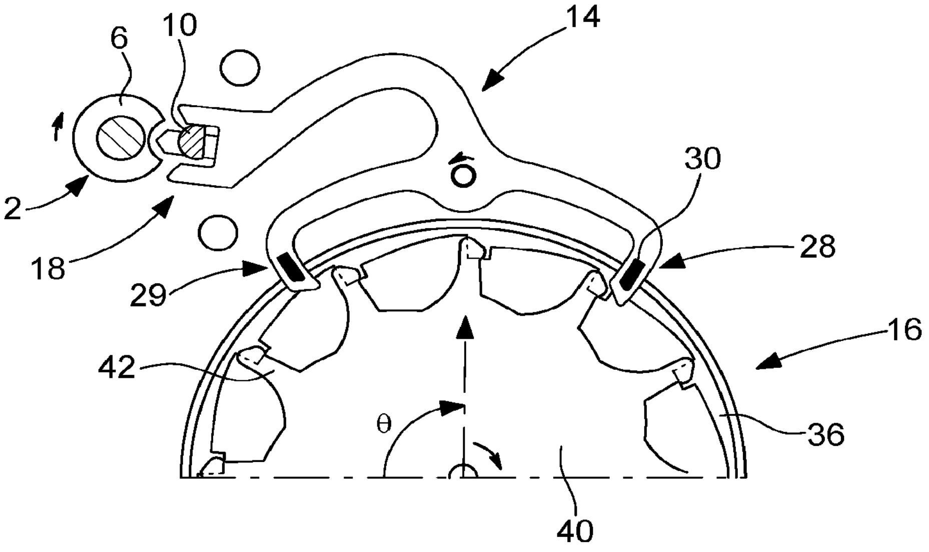
Figure 1H:
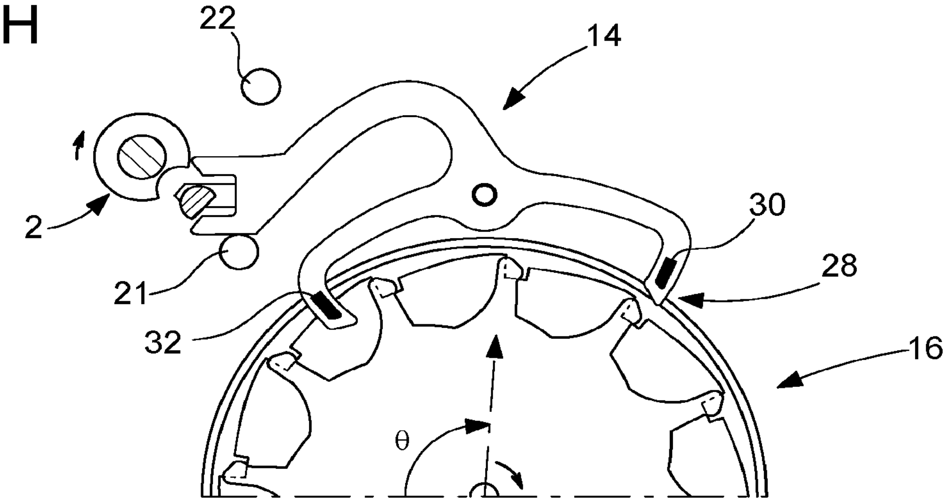
Figure 1I:
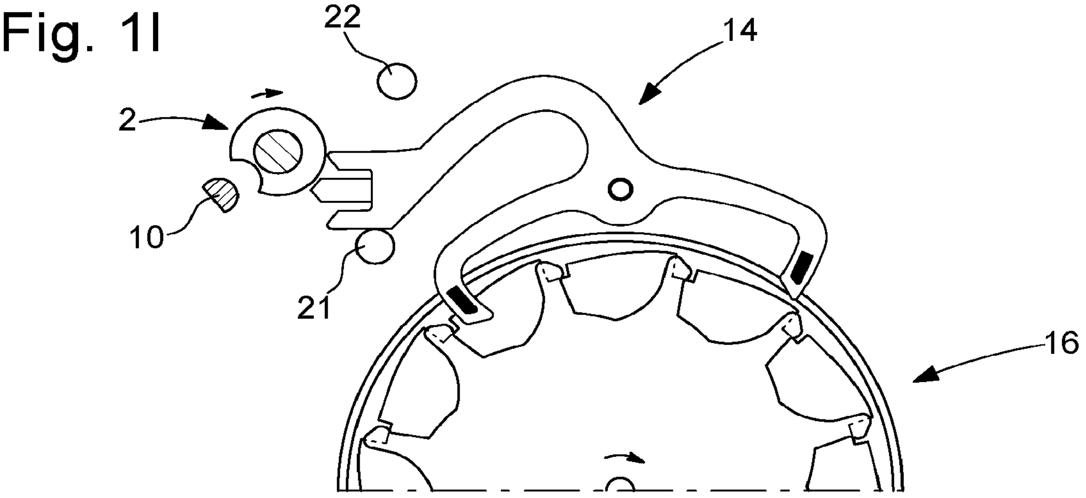

In FIG. 1G, it can be seen the escapement providing a first entirely magnetic sustained impulse, no tooth coming to contact the inclined surface of the mechanical pallet-stone 28, given that the tilting of the pallet assembly has become faster than during the previous vibration. FIGS. 1H and 1I show the assembly formed of the mechanical resonator 2 and of the escapement 12 in a short transient phase before the appearance of a stationary operating phase corresponding to the normal operation of the horological movement whereof the barrel spring has been rewound.

The invention claimed is:

1. A horological movement comprising:

a mechanical resonator and an escapement which is associated with said mechanical resonator, the escapement comprising an escape wheel having a first axis of rotation and a pallet assembly separated from the mechanical resonator and having a second axis of rotation that is different from that of the mechanical resonator; the mechanical resonator being coupled to the pallet assembly in such a way that, when said mechanical resonator has an oscillation, the pallet assembly undergoes a reciprocating movement between two rest positions wherein the pallet assembly remains alternately during successive time intervals; the pallet assembly comprising at least one magnetic pallet-stone formed of a first magnet and the escape wheel comprising a periodic magnetised structure that defines a plurality of magnetic potential energy ascending ramps for said magnetic pallet-stone, each of said magnetic potential energy ascending ramps being provided so that said magnetic pallet-stone can climb said magnetic potential energy ascending ramp when the pallet assembly is in a corresponding rest position from the two rest positions and when a force torque provided to the escape wheel is equal to a nominal force torque or in a range of values that is provided for a normal operation of the horological movement, said magnetic pallet-stone and the periodic magnetised structure being arranged in such a way that the pallet assembly undergoes a magnetic force impulse in the direction of the reciprocating movement thereof, after said magnetic pallet-stone has climbed any one of said magnetic potential energy ascending ramps, when the pallet assembly tilts from one of the two rest positions having enabled said magnetic pallet-stone to climb said any one of the magnetic potential energy ascending ramps to the other rest position;

wherein the escape wheel comprises at least one first distant portion relative to said first axis of rotation and the pallet assembly comprises at least one second distant portion relative to said second axis of rotation;

wherein, when the mechanical resonator is at rest, the pallet assembly has for any angular position $\theta$ of the escape wheel when stopped an equilibrium angular position $\beta_{ER}$ $(\theta)$ that depends on said angular position;

wherein, for any angular position of at least one range of angular positions $(PC_{P1}, PC_{P2})$ of the escape wheel, the first and second distant portions are in contact with one another while the mechanical resonator is at rest and the pallet assembly is in the corresponding equilibrium angular position $\beta_{ER}$ $(\theta)$, the first and second distant portions being arranged in such a way that the equilibrium angular position $\beta_{ER}$ $(\theta)$ of the pallet assembly is, on at least one first portion of each range of angular positions from said at least one range of angular positions of the escape wheel, a monotonic function of the angular position $\theta$ of the escape wheel that moves away from a median position of the pallet assembly with a variation of said angular position θ in the direction of rotation provided for the escape wheel, said median position defining a zero angular position for the pallet assembly at equal angular distance from the two rest positions thereof;

wherein a maximum absolute value ($AM_E$) of the equilibrium angular position $\beta_{ER}$ (θ) of the pallet assembly on said at least one range of angular positions is strictly less than an absolute angular value ($\beta_{Max}$) of the two rest positions, wherein said magnetic pallet-stone is a first magnetic pallet-stone and said second distant portion is a first mechanical pallet-stone that is associated with the first magnetic pallet-stone; wherein the pallet assembly comprises a second magnetic pallet-stone and a second mechanical pallet-stone associated with said second magnetic pallet-stone, said periodic magnetised structure and the pallet assembly being arranged in such a way that said plurality of magnetic potential energy ascending ramps are also defined for the second magnetic pallet-stone, said ascending ramps being able to be climbed, when the force torque provided to the escape wheel is equal to said nominal force torque or in said range of values provided for the normal operation of the horological movement, successively by each of the first and second magnetic pallet-stones, when the pallet assembly is periodically in a first rest position, respectively in a second rest position from said two rest positions, and alternately by said first and second magnetic pallet-stones during the reciprocating movement of the pallet assembly; wherein said second magnetic pallet-stone and the plurality of magnetic potential energy ascending ramps are arranged in such a way that the pallet assembly undergoes a magnetic force impulse in the direction of the movement thereof, after the second magnetic pallet-stone has climbed any one of said magnetic potential energy ascending ramps, when the pallet assembly tilts from the second rest position to the first rest position; and wherein each ascending ramp of said plurality of magnetic potential energy ascending ramps is associated with a different protruding portion of a plurality of protruding portions constituting said at least one first distant portion, and wherein the first and second mechanical pallet-stones of the pallet assembly define, in normal operation, two mechanical stops for said plurality of protruding portions; and wherein the pallet assembly and the escape wheel are arranged in such a way that, when the pallet assembly has said reciprocating movement and said force torque provided to the escape wheel is equal to said nominal force torque or in at least one upper portion of said range of values and after the first or second magnetic pallet-stone has climbed any one of said magnetic potential energy ascending ramps following a tilting of the pallet assembly in the first or second corresponding rest position, the different protruding portion of the escape wheel associated with said any one of said magnetic potential energy ascending ramps undergoes at least one first shock by contacting said first or second mechanical pallet-stone of the pallet assembly, said first shock momentarily stopping the rotation of the escape wheel beyond an angular abutment position, defined by said first or second mechanical pallet-stone, and occurring so as to dissipate at least partially a kinetic energy of the escape wheel acquired following said tilting.

2. The horological movement according to claim 1, wherein the escape wheel and the pallet assembly are arranged in such a way that, when the escape wheel starts to rotate, in a starting phase, from any one of the angular positions θ by being subjected to a starting torque less than or equal to said force torque, it does not encounter any abutment of magnetic or mechanical origin that is likely to stop it before said escape wheel reaches a next range of angular positions, from said at least one range of angular positions ($PC_{P1}$, $PC_{P2}$), on at least one portion of which said at least one first distant portion and said at least one second distant portion are subsequently in contact; and wherein said at least one first distant portion and said at least one second distant portion are configured so that, in said next range of angular positions, the escape wheel subjected to said starting torque is not stopped by the contact between the first and second distant portions concerned but that the first distant portion concerned may transmit at least mostly said starting torque to the pallet assembly.

3. The horological movement according to claim 1, wherein each first distant portion from said at least one first distant portion has, in a polar coordinate system (R, θ) perpendicular to said first axis of rotation and centered thereon, a first inclined surface ($SI_1$) in such a way that each of said at least one second distant portion may slide on said first inclined surface while the escape wheel passes through a corresponding range of angular positions, from said at least one range of angular positions ($PC_{P1}$, $PC_{P2}$), and while the pallet assembly angularly follows a curve defined by the corresponding equilibrium angular positions $\beta_{ER}$ (θ).

4. The horological movement according to claim 1, wherein each second distant portion from said at least one second distant portion has, in a polar coordinate system (R, θ) perpendicular to said first axis of rotation and centered thereon, a second inclined surface ($SI_2$) when the pallet assembly is in any one of the equilibrium angular positions $\beta_{ER}$ (θ) corresponding to any one of the angular positions of a first range of angular positions, from said at least one range of angular positions, wherein said second distant portion is in contact with a first distant portion from said at least one first distant portion ($PC_{P1}$, $PC_{P2}$), the second inclined surface being configured in such a way that each first distant portion from said at least one first distant portion may slide on said second inclined surface while the escape wheel passes through a second range of angular positions, from said at least one range of angular positions, which is relative to the first and second distant portions considered and while the pallet assembly angularly follows a curve defined by the corresponding equilibrium angular positions $\beta_{ER}$ (θ).

5. The horological movement according to claim 1, wherein the escapement is arranged in such a way that, following said first shock and before a next tilting of the pallet assembly, the escape wheel immobilises momentarily in an angular stop position.

6. The horological movement according to claim 5, wherein, when the force torque provided to the escape wheel is equal to the nominal force torque or has a value in at least one upper area of said upper portion of said range of values, said different protruding portion having undergone said at least one first shock, once the escape wheel is momentarily immobile in said angular stop position, presses against said first or second mechanical pallet-stone, so that said angular stop position is then said angular abutment position.

7. The horological movement according to claim 5, wherein, for any force torque in said range of values, said at least one first shock is undergone by the different protruding portion of the escape wheel associated with said any one of said magnetic potential energy ascending ramps; and wherein said different protruding portion, once the escape wheel is momentarily stopped, presses against said first or second mechanical pallet-stone.

8. The horological movement according to claim 1, wherein the periodic magnetised structure is arranged so that an outer periphery thereof is a substantially circular arc of a plurality of discrete circle portions of said magnetised structure, that define respectively said magnetic potential energy ramps, being circularly arranged about said first axis of rotation.

9. The horological movement according to claim 1, wherein said plurality of protruding portions is formed by teeth that extend in a general plane wherein also extend the first and second mechanical pallet-stones supporting respectively said first magnet and a second magnet, forming the second magnetic pallet-stone, which are also located in the general plane.

* * * * *